United States Patent [19]

Harms et al.

[11] 3,918,653

[45] Nov. 11, 1975

[54] WINCH ASSEMBLY

[75] Inventors: Horst Harms; Hans-Jürgen Kunsch, both of Bremerhaven, Germany

[73] Assignee: Aktien-Gesellschaft "Weser", Bremen, Germany

[22] Filed: Feb. 14, 1974

[21] Appl. No.: 442,573

[30] Foreign Application Priority Data
Feb. 17, 1973 Germany............................ 2307978

[52] U.S. Cl............................................... 242/54 R
[51] Int. Cl.².......................................... B65H 75/00
[58] Field of Search...... 242/54 R, 67.1 R, 75, 75.1, 242/75.2, 75.52

[56] References Cited
UNITED STATES PATENTS

| | | | |
|---|---|---|---|
| 3,101,912 | 8/1963 | Bartlett | 242/54 R |
| 3,314,623 | 9/1967 | Blandino | 242/54 R |
| 3,467,360 | 9/1969 | Mizell | 242/54 R X |
| 3,776,519 | 12/1973 | Hamilton | 242/54 R |

*Primary Examiner*—Edward J. McCarthy
*Attorney, Agent, or Firm*—Michael S. Striker

[57] ABSTRACT

A storage drum and friction drums are provided, and an elongated flexible element such as a rope, cable or the like is stored on the storage drum and is in part trained about the friction drums to be paid out and taken up by the same. A regulating arrangement is provided, including a roller about which the flexible element is trained intermediate the storage and friction drums, a shaft which freely turnably mounts the roller, and bearings which mount the shaft and which are eccentric to the axis of the shaft and adjustable.

5 Claims, 2 Drawing Figures

WINCH ASSEMBLY

BACKGROUND OF THE INVENTION

The present invention relates generally to a winch assembly, and more particularly to a winch assembly having a regulating arrangement for the forces which act upon the assembly from the elongated flexible element associated with it.

It is known to provide winch assemblies, especially but not exclusively for deep-sea applications where the assembly is placed aboard a marine vessel, which utilize one or more storage drums on which an elongated flexible element such as a rope, cable or the like is stored, and from which this element is trained about two or more friction drums which pay it out or take it up. The friction drums are provided in the outer circumferential surface with circumferentially extending grooves in which the flexible element travels, and of course the principle of operation is that due to a certain pressure exerted by the element against the circumference of the respective friction drums there will be enough friction with respect to the latter so that no slippage will occur between the drums and the element, thereby permitting the latter to be paid out or taken up. This pressure is obtained by an appropriate tensioning of the elongated flexible element in the region between the friction drums and the storage drum, for which purpose the storage drum is utilized to exert a certain tension upon the portion of the flexible element that is trained about the friction drum.

In certain applications, particularly in the case of highly specialized cables, ropes or the like that are used on scientific ocean exploring vessels and the like, it is particularly important that this tension be maintained constant independently of the angle radius of the portion of the flexible element on the storage drum. Regulating arrangements for this purpose are already known, which act upon the drive of the storage drum and control the drive. However, since the flexible element and sometimes also other components of a winch assembly do have a certain amount of yield, it has heretofore been impossible to avoid fluctuations ranging from high loads to total relaxation in the event of momentary peak loads or of rapid load changes which can, for instance, be the result of changes in the position of the elongated flexible element or of other factors. This means that the friction between the flexible element and the friction drums will be disturbed to a greater or lesser degree or may even totally disappear. This, in turn, leads at the very least to a substantial increase in the wear of the flexible element, and may even cause its breaking.

SUMMARY OF THE INVENTION

It is, accordingly, a general object of the invention to provide an improved winch assembly which is not possessed of the disadvantages outlined above with respect to the prior art.

More particularly, it is an object of the present invention to provide an improved winch assembly having a regulating arrangement which avoids the aforementioned disadvantages.

In keeping with the above objects, and others which will become apparent hereafter, one feature of the invention resides, in a winch assembly, in a combination which comprises a storage drum and friction drums which are spaced from the storage drum. An elongated flexible element is stored on the storage drum and extends in part to the friction drums to be paid out and taken up by the same. Regulating means is provided which includes a roller about which the flexible element is trained intermediate the storage and friction drums, a shaft which freely turnably mounts the roller, and bearings which mount the shaft and which are eccentric to the axis of the same and adjustable.

The purpose of this roller is to compensate for load peaks acting upon the elongated flexible elements, because of a certain amount of yield in the element or for any other reasons, and to absorb overloads which may occur. This function is the result of turning of the eccentric, so that the length of elongated flexible element between the friction drums and the storage drum will be temporarily increased or decreased, so that the tension acting upon it intermediate these two types of drums remains constant. A command unit, furnishing a signal indicative of the desired tension on the elongated flexible element, can be provided, and a measuring device which measures the actual tension, with both values being compared in a comparator which in turn operates a motor, preferably a hydraulic motor with a servo valve control, to provide for a constant tension on the elongated flexible element irrespective of the tension forces which act upon the element downstream of the friction drums, that is intermediate the friction drums and that portion of the flexible element on which a load may be suspended. Thus, constant frictional forces between the elongated flexible element and the friction drum are obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
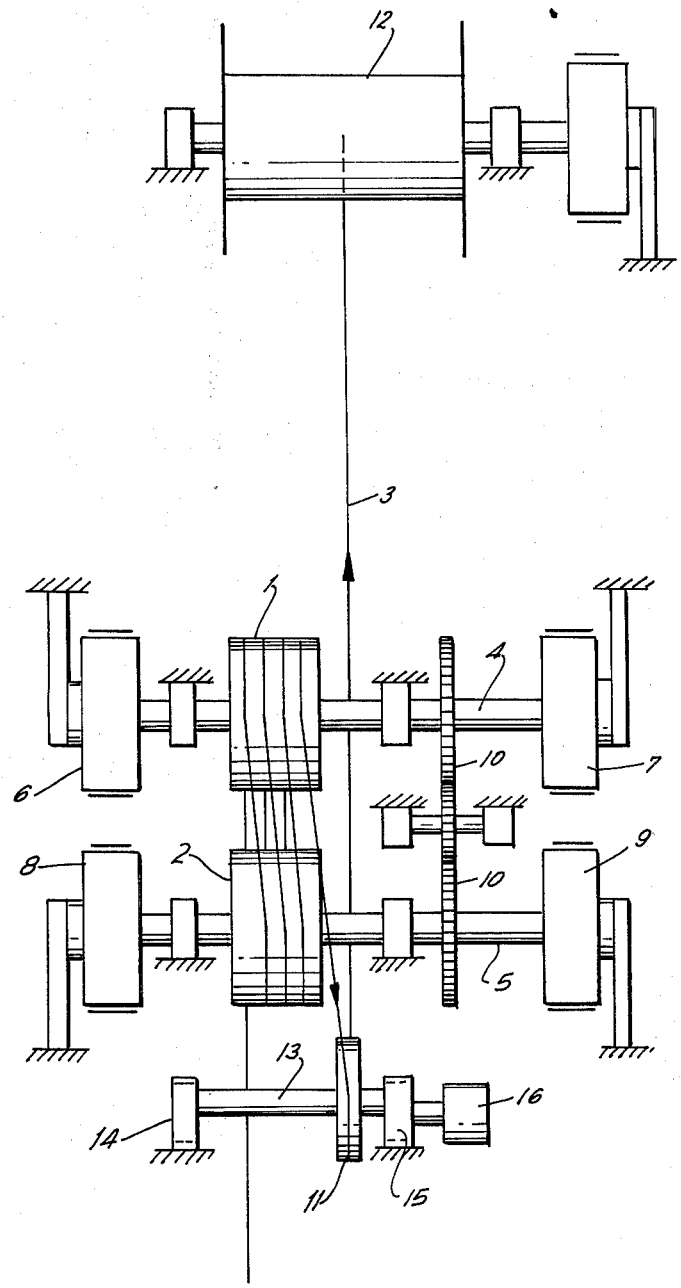
FIG. 1 is a diagrammatic top-plan view illustrating an embodiment of the invention.
Figure 2:
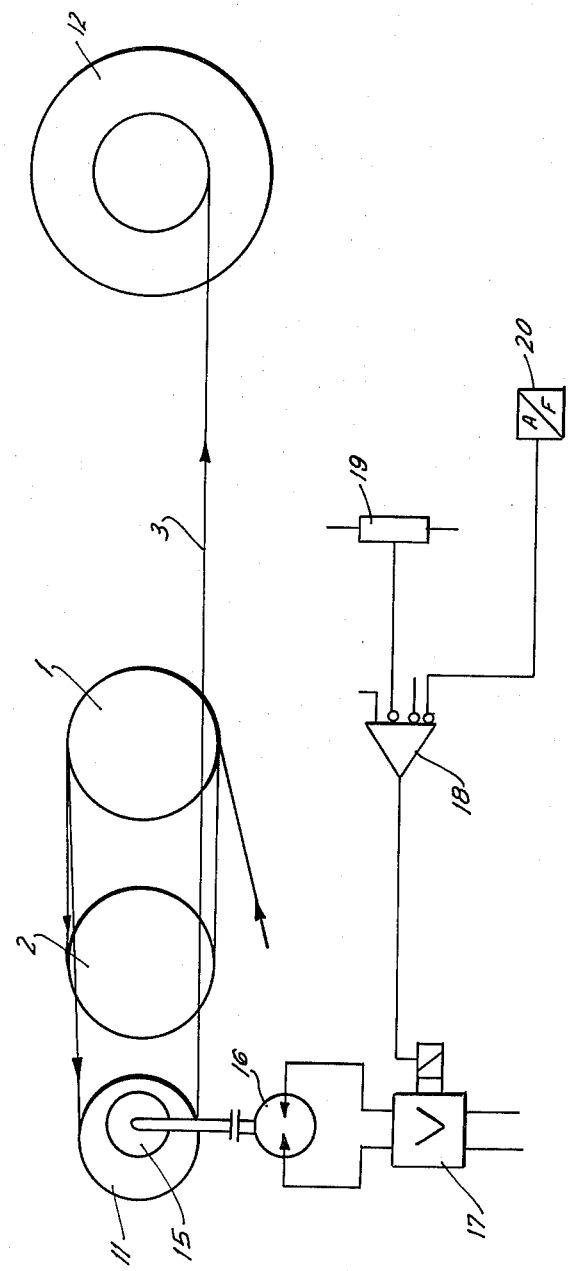
FIG. 2 is a side view of FIG. 1.

FIGS. 1 and 2 show a single exemplary embodiment of the invention having a friction winch which is provided with two friction drums 1 and 2 which are formed in their circumferential surfaces with grooves in which an elongated flexible element 3 such as a cable, a rope or the like, is received. This element is repeatedly trained about the friction drums 1 and 2 which are mounted on shafts 4 and 5, respectively. Each of the shafts 4 and 5 is provided with drive motors, preferably of hydraulic type. The shaft 4 has the drive motors 6 and 7 and the shaft 5 the drive motors 8 and 9, each of the motors being provided with a band brake. Such winches and drive motors with band brakes and associated components are well known and are, for instance, described in U.S. naval training course NAVPERS 10524-C. A reduction gear 10 assures synchronous turning of both of the friction drums 1 and 2.

The element 3 is to be wound onto or paid off from a storage drum 12, and intermediate the latter and the friction drums 1, 2 it is trained about a roller 11 of a regulating arrangement. The roller 11 is freely turnably mounted on a shaft 13 which is provided at its opposite axial ends with journalling pins 14 and 15 which are eccentric with respect to the axis of the shaft and are journalled in stationary bearings which may be mounted on or in the base of the friction winch. A hydraulic regulating motor 16 is connected with one end of the shaft and is controlled via a servo valve 17. The latter is adjusted by means of a tension regulator 18 which receives control pulses as a result of a comparison between a desired fixed signal supplied by a command unit 19 and a measured actual signal supplied by a tension measuring device 20. Tension measuring devices of this type are well known, as are command units, since they both form part of a conventional feedback system wherein a desired fixed control signal is compared against a variable signal, that is the actually measured tension acting upon the element 3 intermediate the drum 12 and the drums 1, 2. When the actual signal deviates from the fixed control signal, the pins 14, 15 are turned appropriately by energization of the servo valve 17 which in turn operates the motor 16, thus maintaining the tension on the element 3 constant at all times.

It will be understood that each of the elements described above, or two or more together, may also find a useful application in other types of constructions differing from the types described above.

While the invention has been illustrated and described as embodied in a winch assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a winch assembly, a combination comprising a storage drum; friction drums spaced from said storage drum; an elongated flexible element stored on said storage drum and extending in part to said friction drums to be paid out and taken up by the same; and regulating means, including a roller about which said flexible element is trained intermediate said storage and friction drums, a shaft freely turnably mounting said roller, and bearing means mounting said shaft for turning displacement about a turning axis which is eccentric with reference to the longitudinal center line of said shaft.

2. A combination as defined in claim 1, wherein said shaft is formed with journalling portions which are eccentrically offset from said axis; and further comprising an adjusting device connected with said portions and associated with said element so as to be subjected to pull exerted by the latter.

3. A combination as defined in claim 2, wherein said device comprises a motor, a measuring device which measures pull in said element intermediate said storage and friction drums and regulates the operation of said motor, and a feedback unit for comparing the measured pull against a predetermined value.

4. A combination as defined in claim 3, wherein said motor is a hydraulic motor having a servo-valve control, and wherein said measuring device regulates the operation of said servo-valve control as a function of deviations of said measured pull from said predetermined value.

5. A combination as defined in claim 1, wherein said friction drums include at least two friction drums mounted for rotation about spaced parallel axes, and wherein said flexible element is trained about the peripheries of said friction drums.

* * * * *